United States Patent [19]

Ahn

[11] Patent Number: 5,126,930
[45] Date of Patent: Jun. 30, 1992

[54] SWITCHED MODE POWER SUPPLY CONTROLLER HAVING A STAND-BY STATE USING A FREQUENCY DIVIDED BURST MODE

[75] Inventor: Yoon S. Ahn, Choongchungnam, Rep. of Korea

[73] Assignee: SamSung Electronics Co., Ltd., Suweon, Rep. of Korea

[21] Appl. No.: 635,666

[22] Filed: Dec. 28, 1990

[30] Foreign Application Priority Data

Dec. 29, 1989 [KR] Rep. of Korea .................. 89-20398

[51] Int. Cl.⁵ .............................................. H02M 3/335
[52] U.S. Cl. ..................................... 363/21; 315/411; 363/67
[58] Field of Search ................. 363/21, 67; 315/411

[56] References Cited

U.S. PATENT DOCUMENTS

| | | | |
|---|---|---|---|
| 4,322,786 | 3/1982 | Weber | 363/21 |
| 4,392,090 | 7/1983 | Rinehart et al. | 315/411 |
| 4,631,654 | 12/1986 | Houee et al. | 363/21 |
| 4,766,528 | 8/1988 | Marinus | 363/21 |
| 4,794,270 | 12/1988 | Park | 363/21 |
| 4,868,662 | 9/1989 | Hartman | 315/411 |

FOREIGN PATENT DOCUMENTS 265322 4/1988 European Pat. Off. .
2230114A 10/1990 United Kingdom .

*Primary Examiner*—William H. Beha, Jr.
*Attorney, Agent, or Firm*—Robert E. Bushnell

[57] ABSTRACT

The present invention relates to a power supply device adapted for various electric or/and electric instruments. The present invention generates lower voltages during a standby mode except for power to a microcomputer, using a frequency-dividing circuit and provides the normal output voltages in operation mode to minimize the power consumption without a relay circuit.

11 Claims, 1 Drawing Sheet

SWITCHED MODE POWER SUPPLY CONTROLLER HAVING A STAND-BY STATE USING A FREQUENCY DIVIDED BURST MODE

BACKGROUND OF THE INVENTION

The present invention relates to a power supply device adapted for various electric or electronic instruments and more particularly to a switching mode power supply controller having two-output-levels minimize the power consumption without the use of a relay circuit in a stand-by site by reducing the level of one of the output voltages of the power supply controller.

In general, the conventional instruments employing the switching mode power supply control the switching frequency or the pulse width to provide constant output voltages, for example, +124, +24 and +16 V, to the corresponding output terminals, respectively. In the stand-by state for which a master switch of the switching mode power supply is in ON-state, the switching mode power supply provides the power only to the necessary parts, for example, a microcomputer and the like and the output voltages for the other parts are cut off by a relay circuit.

On the other hand, if the system does not include the relay circuit, the output voltages are controlled by an ON/OFF switching operation of transistors in accordance with an input supply voltage however, there remain many difficulties when a power supply device having many output terminals to be cut off for the power in the stand-by state. In addition, if none of the output voltages are cut off except the input supply voltage, unnecessary power is consumed in the stand-by state.

SUMMARY OF THE INVENTION

It is an object of the present invention to provide a switching mode power supply controller having two-output-level which lowers the output voltages of the switching mode power supply, except the input supply voltage, in the stand-by state to minimize the power consumption for the stand-by state, while providing normal output voltages in the operation state.

According to the present invention, there is provided a switching mode power supply controller having two-output-levels, including a switching mode power supply circuit which provides output voltages by driving a transformer using a switching transistor in response to an input square wave, further comprising: a frequency-dividing circuit connected to an input terminal for receiving the square wave, for changing the frequency of the square wave from f to f/N, a controlling circuit connected to the frequency-dividing circuit for controlling the output voltages of the frequency-dividing circuit in accordance to a power control signal of a microcomputer; and a switching circuit connected to a primary coil of the transformer for controlling the output voltages of the switching mode power supply circuit according to the operation of the frequency-dividing circuit.

BRIEF DESCRIPTION OF DRAWINGS

These and other objects, features, and advantages of the present invention will become more apparent from the following description for the preferred embodiments taken in conjunction with the accompanying drawings, in which.

DETAILED DESCRIPTION OF THE PREFERRED EMBODIMENTS

Figure 1:
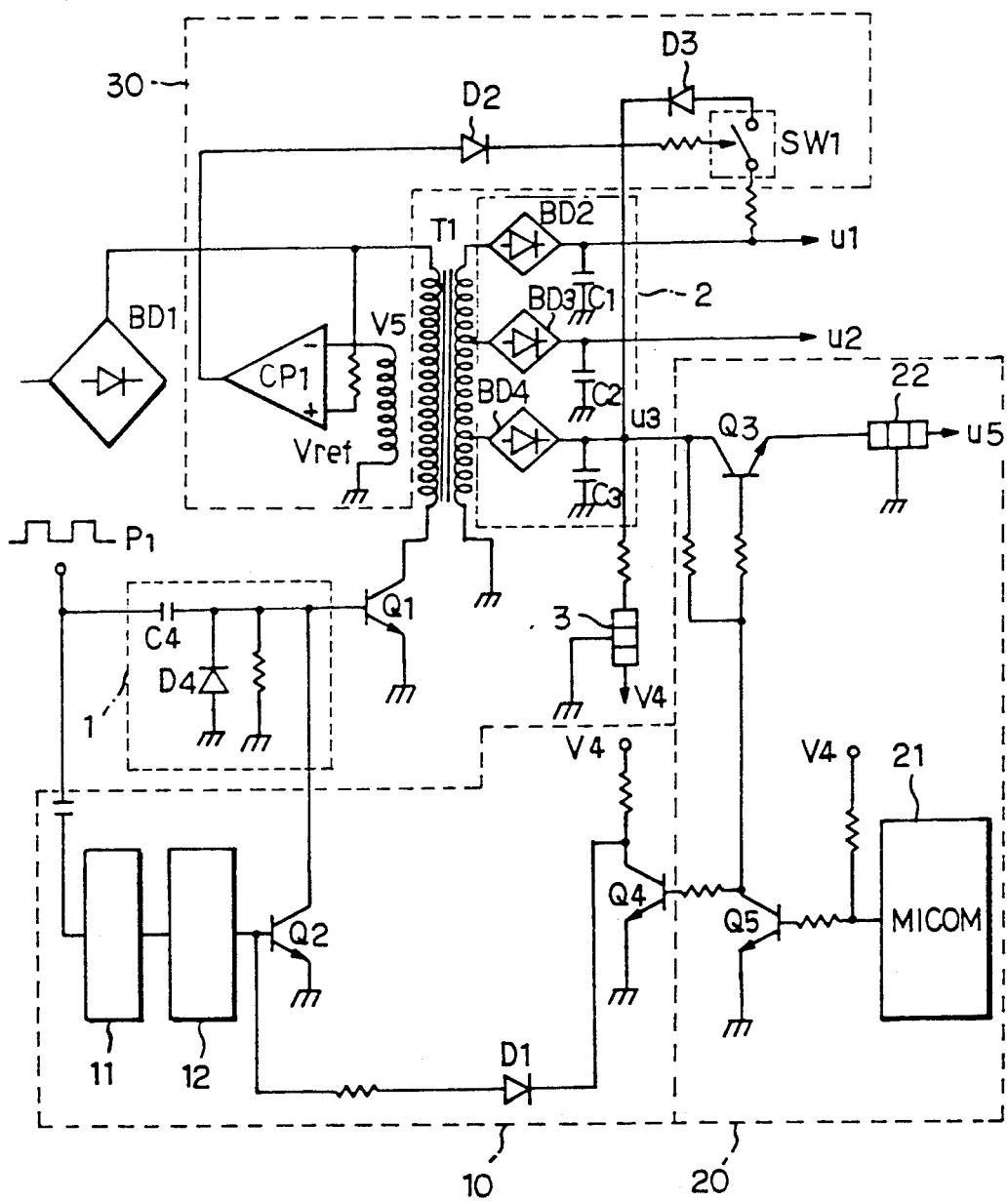
FIG. 1 is a circuit diagram of a switching mode power supply controller having two-output-levels according to the present invention.

The present invention will now be described in more detail with reference to the accompanying drawings.

FIG. 1 shows a circuit of a switching mode power supply controller having two-output-levels. A switching transistor Q1 is connected to a first smoothing circuit 1 which smooths an applied square wave P1 from an input terminal. Conversely, a primary coil of a transformer T1 is connected to a bridge-type rectifier BD1, while its secondary coil is connected to a second smoothing circuit 2 which is operated by the driving of the transistor Q1.

The second smoothing circuit 2 consists of bridge-type rectifiers BD2 to BD4 and smoothing capacitors C1 to C3, and three output terminals U1 to U3, that is, output terminals for output voltages, such as +124 V, +24 V and +16 V. Also, a +5 V regulator 3 is connected to the +16 V output terminal U3. On the other hand, a frequency-dividing circuit 10 is connected to an input terminal.

In the frequency-dividing circuit 10, a divide-by-N counter 11 for changing the frequency of a square wave P1 from an input terminal from f1 to f1/N is connected to a digital delay part 12 for delaying the square wave signal during a reset time of a microcomputer 21, and two switching transistors Q2 and Q4 are connected to the digital delay part 12.

Subsequently, a controlling circuit 20 is connected to the frequency-dividing circuit 10 to control it in accordance with a power control signal of the microcomputer 21. The controlling circuit 20 consists of two switching transistors Q3 and Q5 which are driven by the power control signal of the microcomputer 21 and a +5 V regulator 22 connected to an emitter of the transistor Q3. Finally, a switching circuit 30, which controls output voltages according to the operation of the frequency-dividing circuit 10, is connected between the primary coil of the transformer T1 and the +125 V output terminal U1.

In the switching circuit 30, an output voltage of a comparator CP1, which compares a voltage V5 induced from the transformer T1 according to the driving of the transistor Q1 with a reference voltage Vref applied from a bridge-type rectifier BD1, is applied to the control terminal of a switch SW1 through a diode D2 and thus the switch SW1 is switched according to the operation state of the comparator CP1. Also, another terminal of the switch SW1 is connected to the +16 V output terminal U3 and a regulator 3.

To explain the operation of the present invention in detail, it is as follows. The input square wave P1 is smoothed by the first smoothing circuit 1 and this smoothed signal is applied to the base of a transistor Q1 to drive the transistor Q1. Also, the DC voltage is supplied to the transformer T1 through the bridge-type rectifier BD1. According to the driving of the transistor Q1, therefore, the output voltage appears at the terminals U1 to U3 through the bridge-type rectifiers BD2 to BD4 and the capacitors C1 to C3 connected to the secondary coil of the transformer T1. The output voltage 16 V at the terminal U3 is applied to the +5 V regulator 3 and the output voltage of the +5 V regulator 3 is provided to the microcomputer 21.

On the other hand, the microcomputer 21 provides the power control signal of high level in a stand-by state, while in the normal operation state it provides the power control signal of low level. Thus, the transistor Q5 is turned on by the high level signal provided from the microcomputer 21 in the stand-by state and the transistors Q3 and Q4 are turned off since the level at the collector of the transistor Q5 becomes low. At this time, the high level voltage at the collector of the transistor Q4 is not passed through the diode D1, by the off-state operation of the diode D1 and thus it has no effect on the transistor Q2.

On the other hand, the frequency of the square wave P1 is reduced from f1 to f1/N by the divide-by-N counter 11 and an output signal of the divided-by-N counter 11 is applied to the base of the transistor Q2 after it is delayed by the digital delay part 12 until the microcomputer 21 is reset. In the stand-by state, thus, the frequency f1 of the square wave P1 is divided by a factor of N so that the output voltages of the transformer T1 are dropped, that is, the voltages at the output terminals U1 to U3 are reduced to +125/N V, +24/N V and +16/N V, respectively.

In other words, in the stand-by state, the output voltages of the switching mode power supply are lowered by the ratio 1/N. Then, these lowered voltages correspond to a feedback voltage. As such, the voltage V5 which is applied from the transformer T1 to the inverting terminal of the comparator CP1 is downed from V5 to V5/N since the transformer T1 is driven with the reduced frequency of f1/N by the transistor Q1.

On the other hand, to the non-inverting terminal of the comparator CP1, the DC reference voltage Vref is applied from the bridge-type rectifier BD1. Then, the comparator CP1 compares the DC reference voltage Vref with the voltage V5 induced from the transformer T1. At this time, if the voltage V5 is changed to V5/N, the comparator CP1 turns on the switch SW1 to provide the output voltage at the terminal U1 to the other terminal U3. Thus, the output voltage at the terminal U3 is also lowered by 1/N since the voltage at the terminal U1 is lowered by 1/N. That is, in the stand-by state, both voltages at the output terminals U3 and U4 are lowered so that the microcomputer 21 is not driven. In order to drive the microcomputer 21 in the stand-by state, therefore, higher voltage is required.

The switch SW1 is turned on to provide the higher voltage of the terminal U1 to the terminal U3 and thus the regulator 3 provides a normal voltage V4 to the microcomputer 21 so that the microcomputer 21 is maintained during the stand-by state. Thus, when the output voltages of the switching mode power supply are lowered, the microcomputer 21 can maintain the stand-by state since the lowered output voltages are superposed by the switch SW1 and the superposed voltage is applied to the MICOM 21 through the regulator 3.

Next, the normal operation state, when the power is turned on in the stand-by state, will be described. If the power is in ON-state the power control signal of the microcomputer 21 is changed to low level and thus the transistor Q5 is turned off so that the transistor Q4 is turned on in order to go to low level at the collector of the transistor Q4 for the purpose of forming an open-circuit of the transistor Q2. During an off-state switching operation of the transistor Q2, the divided f1/N square wave pulse P1 of the divided-by-N counter 11 has no effect on the transistor Q1 and this means that the divide-by-N operation is stopped and the square wave P1 is directly applied to the base of the transistor Q1 through the first smoothing circuit 1.

Also, the transistor Q3 is turned on for an off-state operation of the transistor Q5, and thus the voltage at the output terminal U3 is applied to the regulator 22 to provide a normal operation voltage to a system (not shown). Since the transistor Q1 is driven by the original frequency f1 of the square wave pulse, P1, the voltage V5 applied to the inverting terminal of the comparator CP1 is divided-by-N and not appeared and this voltage V5 causes the switch SW1 to be cut off in response to the resulted value out of comparing the voltage V5 with the reference voltage Vref. Thus, the comparator CP1 provides the lower level output and thus the switch SW1 is turned off. Thus, when the switching mode power supply is in the normal state, normal rate voltages such as +125 V, +24 V and +16 V are outputted from the corresponding output terminals U1, U2 and U3, respectively so as to be in a normal operation of system.

As mentioned hereinabove, the present invention according to the electric or/and electronic instruments employing the switching mode power supply maintains the other downed output voltages, except the stand-by state voltage for the microcomputer 21, in the stand-by state and provides the normal output voltages in power-on state to minimize the power consumption by reducing the unnecessary power at the stand-by state.

The invention is in no way limited to the embodiment described hereinabove. Various modification of the disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A switched mode power supply, comprising:
   transformer means for generating a first output voltage and a second output voltage;
   switching means for driving a primary coil of said transformer means in response to a first signal when said switched mode power supply in an on state and for driving said primary coil in response to a second signal when said switched mode power supply is in a standby state;
   frequency-dividing means for receiving said first signal and for frequency dividing said first signal to generate said second signal;
   controlling means for controlling said switching means in accordance with a power control signal of a microcomputer; and
   switching circuit means connected to a primary coil of said transformer means for controlling said first output voltage and said second output voltage according to the operation of said switching means.

2. The switched mode power supply, according to claim 1, wherein said frequency-dividing means comprises:
   a divide-by-N counter for changing the frequency of said first signal to generate said second signal; and
   a digital delay means for delaying said second signal for a reset time of said microcomputer.

3. The switched mode power supply, according to claim 1, wherein said switching circuit means comprises:

a comparator for comparing a voltage induced from said transformer with a reference voltage applied from a first rectifier and generating a comparator signal; and a switch for electrically interconnecting at least two output terminals of said switched mode power supply in response to said comparator signal received through a diode.

4. A switched mode power supply, comprising:

transformer means for generating a first transformer means output voltage and second transformer means output voltage;

transistor means for controlling a current flow through a primary coil of said transformer means, said transistor means receiving a first signal if said switched mode power supply is in an on state and a second signal if said switched mode power supply is in a standby state;

frequency-dividing means for receiving said first signal and for frequency dividing said first signal to generate said second signal; and switching means for controlling a voltage of at least one output of said switched mode power supply during said standby state.

5. The switched mode power supply, according to claim 4, wherein said frequency-dividing means comprises:

a divide-by-N counter for changing the frequency of said first signal to generate said second signal; and a digital delay means for delaying said second signal for a reset time of a microcomputer.

6. The switched mode power supply, according to claim 4, wherein said switching means comprises:

a comparator for comparing a voltage induced from said transformer means with a reference voltage to generate a comparator signal; and switch means for connecting a first switched mode power supply output to a second switched mode power supply output in response to said comparator signal.

7. The switched mode power supply, according to claim 6, wherein said switch means connects said first switched mode power supply output to said second switched mode power supply output so that a microcomputer receiving power from said second switched mode power supply output receives an adequate voltage to operate, wherein said microcomputer generates a mode signal for controlling whether said transistor means operates in response to said first signal or said second signal.

8. The switched mode power supply, according to claim 6, further comprising a first smoothing circuit for smoothing said first signal applied to said transistor means.

9. The switched mode power supply, according to claim 8, wherein said first signal is a periodic square wave.

10. The switched mode power supply, according to claim 6, further comprising a second smoothing circuit for smoothing and rectifying a first transformer means output voltage to generate said first switched mode power supply output and for smoothing and rectifying a second transformer means output voltage to generate said second switched mode power supply output.

11. The switched mode power supply, according to claim 6, further comprising cutoff transistor means for cutting off power delivered by said second switched mode power supply output so that only said microcomputer receives power.

* * * * *

UNITED STATES PATENT AND TRADEMARK OFFICE
CERTIFICATE OF CORRECTION

PATENT NO. : 5,126,930
DATED : 30 June 1992
INVENTOR(S) : Yoon-Soon AHN

It is certified that error appears in the above-identified patent and that said Letters Patent is hereby corrected as shown below:

IN THE CLAIMS

Column 4, Line 45, insert --is-- after "supply".

Signed and Sealed this

Twelfth Day of April, 1994

*Attest:*

BRUCE LEHMAN

*Commissioner of Patents and Trademarks*

*Attesting Officer*